Oct. 30, 1956 R. L. MARTIN ET AL 2,769,119

PRINTED CIRCUITS

Filed Feb. 28, 1951 3 Sheets-Sheet 1

INVENTOR.
EDWIN KEITH NELSON
ROBERT LORING MARTIN

BY Ostrolenk & Faber

ATTORNEYS

Oct. 30, 1956 R. L. MARTIN ET AL 2,769,119

PRINTED CIRCUITS

Filed Feb. 28, 1951 3 Sheets-Sheet 2

INVENTOR.
EDWIN KEITH NELSON
ROBERT LORING MARTIN

BY Ostrolenk & Faber

ATTORNEYS

Oct. 30, 1956 R. L. MARTIN ET AL 2,769,119

PRINTED CIRCUITS

Filed Feb. 28, 1951 3 Sheets-Sheet 3

INVENTOR.
EDWIN KEITH NELSON
ROBERT LORING MARTIN

BY

Ostrolenk & Faber

ATTORNEYS

United States Patent Office 2,769,119

Patented Oct. 30, 1956

2,769,119

PRINTED CIRCUITS

Robert Loring Martin, Whittier, and Edwin Keith Nelson, Pico, Calif., assignors to Standard Coil Products Co. Inc., Los Angeles, Calif., a corporation of Illinois Application February 28, 1951, Serial No. 213,125

3 Claims. (Cl. 317—101)

Our invention relates to printed circuits and more particularly to novel methods for mounting of components on the printed circuit. Circuits are defined as being "printed" when they are produced on an insulated surface by any process. The methods of printing circuits may fall into the following classifications: painting, spraying, chemical deposition, vacuum process, die stamping, dusting, or by photographic means.

The photographic means which we have found particularly suited for mass production is the photo-etch process.

The photo-etch process consists of sensitizing a dielectric sheet, which may be Bakelite, having a thin film of copper or other conducting material deposited thereon. The sensitized plate is placed behind a negative having the desired circuit configuration as the transparent portion thereof. The intense light from an arc lamp makes the sensitizer, which may be coal-tar, insoluble to an alcohol. After the exposure to the intense light, the plate is dipped in an alcohol washing away the soluble portions. The resulting board is dried for approximately five minutes at 180° Centigrade which cures the coal tar making it highly susceptible to an etching process. The board is then etched, using a ferric chloride which removes the exposed copper leaving the copper under coal tar intact. The entire plate is then washed and the coal scrubbed off. The plate may be silver plated to increase the conductivity of the circuit elements.

The principal physical effect of printed circuits is to reduce electronic circuit wiring essentially to two dimensions. A properly designed printed circuit offers size reduction comparable to the best of standard miniature electronics practice.

Although size reduction is the factor that has attracted the most attention, there are other equal or more important advantages to be gained from the use of the techniques. Uniformity of production, reduction of assembly and inspection time and costs and reduction of line rejects make the processes attractive, even in applications where size is not important. Purchasing and stocking of electronic components and accessories are reduced considerably as many items are eliminated and others, such as the wide variety of resistors, usually are replaced by a few types of paints. Obsolescence of components is also avoided in great part. The new wiring processes eliminate as much as 60 percent of the soldering needed for conventional circuits.

Heretofore in the prior art disc capacitors were soldered to the plate with a low temperature solder, such as 20 percent tin, 40 percent bismuth, and 40 percent lead. This solder has a melting point of 110° C. Soldering was accomplished by laying the capacitors over a silvered area of the plate, after tinning the surface, and pressing down on top with a soldering iron. An additional soldering operation is required to connect the top plate of the disc capacitor to the rest of its circuit. In such operation it is very difficult to control the human operator error in the positioning of components. At the very high frequencies for which printed circuits are particularly applicable, deviations as low as one hundredth of an inch may produce a substantial differentiation in the operation of the circuit. Trained operators can vary the placement of components, depending upon the weather, upon the state of their health, or upon many other possible considerations.

Moreover, the soldering of individual components produces thermal shock as one localized section is heated while the remainder of the capacitor or component remains cool. This shock produces a permanent change in the hysteresis of ceramic capacitors noticeable even at substantially lower frequencies.

Moreover, additional considerations at high frequencies are applicable with regards to the inductance of the wiring leads. When, for example, a lead is wired with No. 24 wire, even $\frac{1}{16}$ inch presents an appreciable inductive reactance at 200 megacycles.

Much of the cost of the disc and especially the tubular capacitor is in the wiring auxiliary process. The elimination then of the wiring would be a highly desirable feature of a printed circuit.

Our invention overcomes these difficulties by providing a method of accurately positioning the components on the printed circuit utilizing springs and clips.

The present invention has then as one of its principal objects the provision of a method that will eliminate the human operator error in the placement of components.

Another important object of the present invention is the reduction of lead inductance at high frequency.

Still another object of the present invention is the provision of a novel method of mounting components wherein the components may be dip soldered.

Still another object of the present invention is the provision for the elimination of the costly wiring of tubular capacitors.

Still another object of the present invention is the provision for the elimination of the costly wiring of disc capacitors.

Still another important object of the present invention is the reduction of thermal shock causing hysteresis changes in the dielectric.

Still another object of the present invention is the provision of a method of mounting a plurality of components so that they may be dip soldered in one operation.

Still another object of the present invention is the provision of a method of positioning components accurately.

The foregoing and many other objects of our invention will become apparent in the following description and drawings in which:

Figure 1 shows a circuit diagram of a tuner circuit for television reception wherein the various problems of the prior art discussed above are illustrated and solved in accordance with the features of the present invention. The solution of these problems results in a printed board of the configuration illustrated in Figure 2 wherein all of the components may be dip soldered simultaneously.

Figure 1:
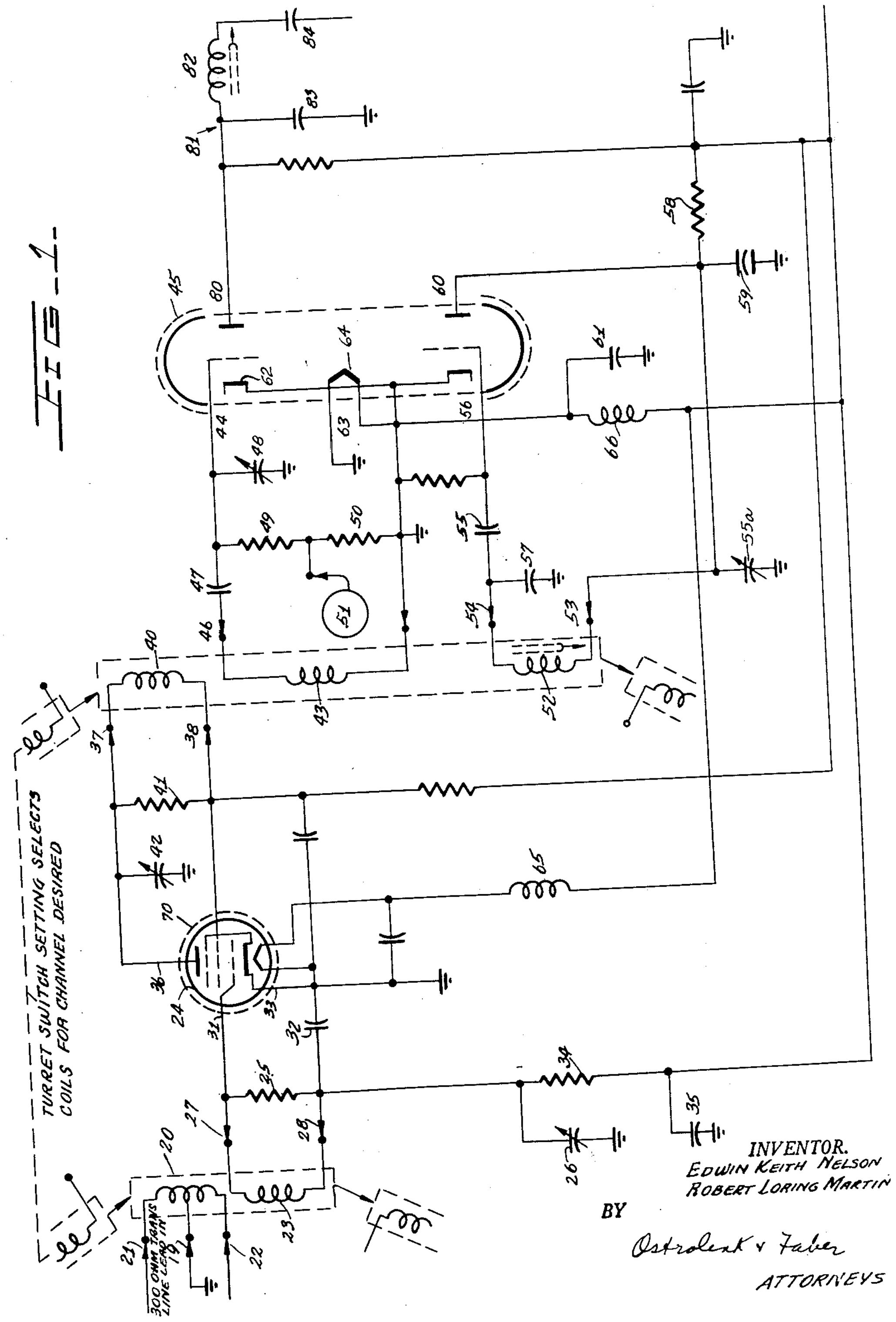
Figure 1 is a circuit diagram with various components of the present invention.
Figure 2:
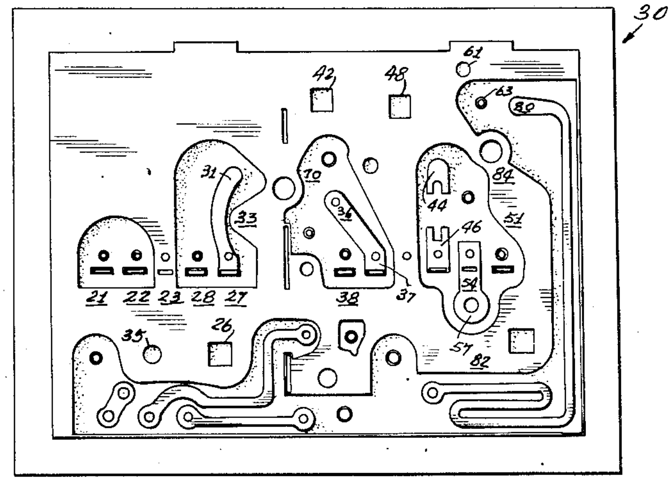
Figure 2 is the printed base of the circuit in Figure 1.

The particular circuit shown in Figure 1 and the printed board of Figure 2 do not then constitute in their entirety invention but are discussed so as to illustrate the importance of the present invention in one particular circuit. Our invention may be combined in a variety of possibilities in other circuits which do not resemble the circuit of the tuner in Figures 1 and 2.

Referring then to Figure 1, where all the following components are shown, and to Figure 2, where only the paths and junctions of the mounted components are shown, the input 300 ohm transmission line connects into input coil 20 at points 21 and 22 and is returned to ground at contact 19 through the balanced coil system 20. Coil 20 which is directly coupled to the antenna is electrically coupled to secondary coil 23. Secondary coil 23 is connected to the grid of the first amplifier tube 24 which may be a 6AG5 tube and also to the grid return circuit which supplies the bias to tube 24. This grid return circuit consists of a wired resistor 25 and a trimmer capacitor 26 added separately by an operator. The components added are mounted in position utilizing springs and clips, as is hereinafter described, so that contact is made and the unit may be dip soldered in one operation.

The resistor 25 may have 3900 ohms resistance and is mounted on the printed board 30 from contacts 27 and 28 which essentially shunts secondary coil 23. The grid return circuit commences at grid 31 of tube 24 and passes through the parallel combination of the resistor 25 and the secondary 23 to trimmer 26 to ground. The trimmer 26 is shunted to ground by a fixed capacitor 32. The fixed capacitor 32 is connected to the cathode 33 of tube 24. The cathode 33 is then connected to capacitor 26 and to another resistor 34, having a resistance of 47,000 ohms through capacitor 32. The resistor 34 is mounted in a similar manner to the other components as is hereinafter described and is connected to a drum capacitor 35. Drum capacitor 35 connects the resistor 34 to ground and provides isolation and by-pass to any oscillatory currents which may be present in the circuit, essentially controlling oscillator radiation from the tuner.

The input signal enters the grid 31 of tube 24 and is amplified to plate 36. The plate circuit, as is hereinafter described in detail, enters the turret assembly 40 at 37 and returns to the printed board at 38. The resistor 41 shunts the inductance 40.

From the junction 37 of resistor 41 and inductance 40 a trimmer capacitor 42 is connected to ground. Inductance 40 is linked with coil 43, actually a mixer grid inductance, which in general connects to the grid 44 of tube 45. Tube 45 may be a 6J6 and acts as an oscillator and mixer in the present circuit. The inductance 43 is connected through contact point 46 to a 100 micromicrofarad capacitor 47. The 100 micromicrofarad capacitor 47 is a tubular capacitor, hereinafter described in detail with reference to Figure 4. A disc capacitor of 100 micromicrofarad capacity and of the required temperature coefficient would be too large. This grid circuit is a highly critical circuit with regard to inductances where every bit of inductance is a detriment. The tubular capacitor and the associated mounting results in a minimum of inductance.

Capacitor 47 connects to the grid 44 and to a trimmer capacitor 48 which is connected to ground. The junction of capacitor 47 and capacitor 48 is connected to ground through the series circuit of resistor 49 and resistor 50. The junction 51 of resistor 49 which is 4700 ohms and resistor 50 which is 220,000 ohms is a test point usually brought to the top of the chassis, not shown. This test point is used for test purposes in aligning television tuners.

The inductance 43 is electrically coupled to inductance 52, the oscillator inductance. Inductance 52 connects to contacts 53 and 54 on the printed board 30. Contact 53 connects through another trimmer capacitor 55a to ground and contact 54 to the other grid 56 of tube 45 and through capacitor 57 to ground. Contact point 53 is also connected to a 4700 ohm resistor 58 which supplies B+ to the oscillator plate 60 and to sharp tuning capacitor 59 connected to ground.

A by-pass capacitor 61, which is a quarter of an inch disc type capacitor, is used to by-pass the mixer filament 62 and heater 64 to ground.

Returning to tube 24, the filament connection is removed for grounding reasons. The filament inductance 65 connects between the filaments 66 and 67 and an inductance 68 which leads to filaments 62 and 63 of tube 45.

In any radio frequency amplifier cathode lead inductance is of extreme importance to the gain that can be obtained from the amplifier. It becomes then important to ground the cathode in the shortest possible way and by the broadest ground paths. Moreover, in following through the ground circuit of plate 30 which has a configuration to reduce interlink ground coupling which results in instability, it is evident that contact 70, the shield of tube 24, is the ground of the tube. The screen inductance to ground is critical in controlling couplings between the screen grid of tube 24 and other circuits which carry undesirable radiation.

The plate trimmer capacitor 42 is likewise critical with regard to parasitic oscillations which occur at high frequencies.

The printed board 30 is also set up to accommodate intermediate frequency units not included in the discussion from contact 80, the plate of the mixer. Contact 80 connects to the intermediate frequency units through a filter circuit 81. Filter circuit 81 is a Pi shaped filter consisting of series inductor 82 and capacitors 83 and 84.

The various other components shown in Figure 1 are contained in the figure to complete the circuit and are not discussed further here.

The various problems presented in high frequency tuners pertaining to the present invention have been brought out and solutions using disc capacitors, tubular capacitors, etc. have been mentioned.

Figure 3:
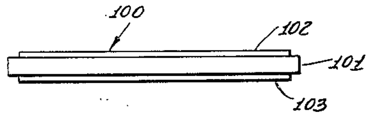
Figure 3 is a cross-sectional view of a disc capacitor.
Figure 4:
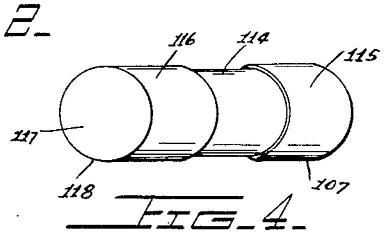
Figure 4 is a perspective view of a tubular capacitor.

Figure 3 and Figure 4 show a disc and tubular capacitor, respectively.

Referring to Figure 3, disc capacitor 100 has a dielectric base 101 which is coated at 102 and 103 in whole or in part with silver or other conductive material.

Figure 9:
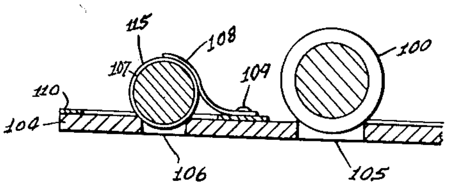
Figure 9 is a cross-sectional view of a printed board.

The printed board 104 in Figure 9 is provided with any suitable electrical printed circuit desired. The capacitors for this printed circuit are to be seated in slots 105 and 106, positioning disc capacitor 100 and a tubular condenser 107, hereinafter described in detail with reference to Figure 4. The slots are cut so as to exactly position the mounted component on the printed board. The dimension of the slot must be such as to prevent the mounted component from slipping through. Varying the dimensions of the slot slightly in the above limits will determine just how far the components enter into or through the board. The positioning then of the components is accurately determined.

A contact clip 108 in Figure 9, which can be riveted or eyeleted at 109 or by other means fastened to the printed board 104, will in general, make contact with another added element or with a printed component 110 on the board. The purpose of this contact clip 108 is twofold; first to provide a connection electrically and second to act as a spring keeping the tubular condenser 107 in place, while it is dip soldered. The clip 108 consists of a small piece of spring material approximately 1/16 inch wide with an enlarged terminal 109, at one end, to allow a 1/16th eyelet through it to hold it in place.

Figure 10:
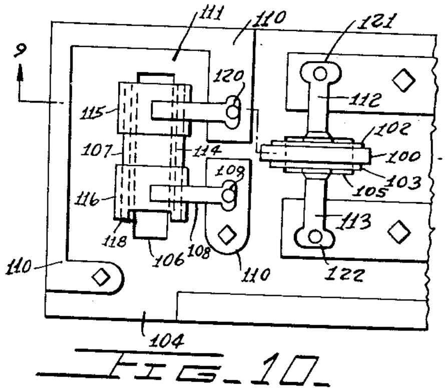
Figure 10 is a top view of a segment of an assembled printed board.

The clip 108, as well as other clips 111, 112 and 113 are seen in Figure 10. Clips 108 and 111 make connections with the tubular condenser 107 and clips 112 and 113 make connection with the disc condenser 100.

Tubular condenser 107, as shown in Figure 4, consists of a dielectric tube 114 having two separated conductive exterior coatings 115 and 116. Conductive coating 116 is connected to the interior conductor 117 at 118 in a continuous manner. The interior conductor 117 covers approximately 75% of the interior tubular surface.

Clip 108 contacts conductive strip 116 and clip 111 contacts conductive strip 115 which are essentially the opposite plates of the tubular condenser 107. Clip 108 is eyeletted at 109, as described above, and clip 111 is eyeletted at 120. Eyelets 109 and 120 make contact to different parts of the printed circuit 110 on board 104.

Tubular condenser 107 is then accurately positioned in place on the printed board 104 making contact with the appropriate elements of the printed surface 110 by means of the slot 106 and clips 108 and 111.

Similarly, the disc condenser 100 is positioned in place. The disc condenser 100 partially enters slot 105 as described above. The conducting surfaces 102 and 103 make contact with the printed surface 110 by means of positioning and conducting clips 112 and 113. Clip 112 is eyeletted at one end 121 and clip 113 is eyeletted at one end 122. The eyelets 121 and 122 rigidly attach the clips 112 and 113 to the board 104.

Small disc capacitors with the wide clip connections offer much lower inductances than is found in the conventional load type of condenser. Other condensers which are of low inductance have been prohibitive in cost for commercial use.

The disc capacitor is simply clipped in place and dip soldered, having no leads to put in.

Figure 11:
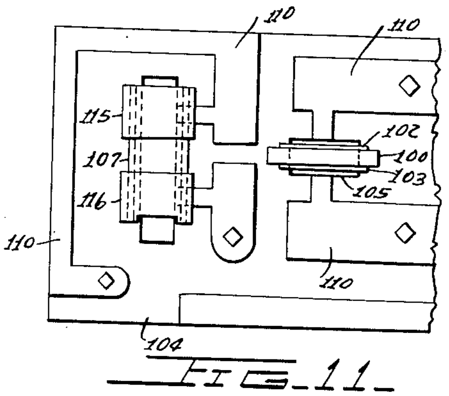
Figure 11 is a top view of another segment of an assembled board.

The disc capacitor and tubular condenser can be mounted without utilizing springs or clips as in Figure 11. The printed circuit 110 reaches the edge of the slots 105 and 106 and the soldering operation holds the capacitors in place with the elements 115, 116, 102 and 103 of capacitors 107 and 100, making direct connection to the printed circuit 110 of board 104.

Figure 12:
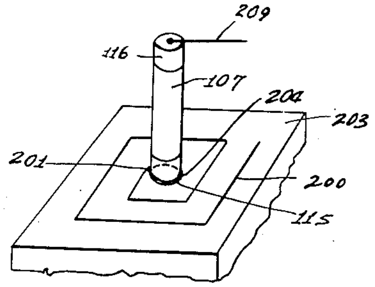
Figure 12 is a cross-sectional view of a mounted tubular capacitor.

The tubular capacitor 107 may be mounted against one of the prongs of a tube as is hereinafter described with reference to Figure 14 and it may also be mounted having its longitudinal axis perpendicular to the printed board as shown in Figure 12.

Figure 13:
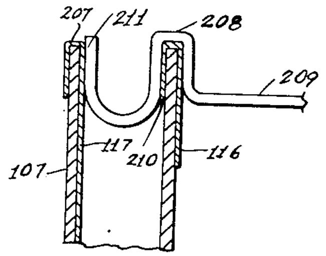
Figure 13 is a cross-sectional view along line A—A of Figure 12.

Referring to Figure 12, the tubular capacitor 107 is mounted in circular slot 204 in board 203. Board 203 carries a printed circuit 200 which makes contact with the tubular condenser at 201. The conducting surface 115 of the tubular capacitor 107 makes the contact at 201. The other end of the capacitor 116 has a lead 209 soldered to it, shown more particularly with reference to Figure 13. The lead 209 is bent at 208 and soldered in position with solder 210. The end of the lead 211 is bent in shape and soldered to conductor 117 at 207. The lead 209 may be a lug on a tube socket.

Figure 14:
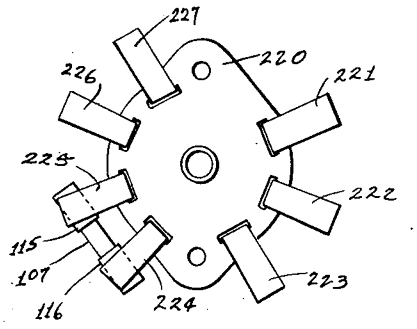
Figure 14 is a bottom view of a printed board of the invention.

Figure 14 shows a tube socket 220 with lugs 221 through 227. Lugs 224 and 225 make connection to the ends 115 and 116 of tubular condenser 107.

The dip soldering of tube sockets to the printed circuit offers great savings. The average tube socket represents ten to fifteen connections which must be wired and soldered. If the socket contact tails are flared out at the bottom of a molded socket and the parts or connections on the printed circuit are brought to the corresponding physical positions, the socket may be riveted to the top of the printed board. This brings the socket contacts to the same locations mechanically as the circuits. By using a tight cover over the top of the socket, this whole assembly may be dip soldered in almost any position. This eliminates much of both the wiring and soldering labor. On subminiature components it makes easy and reliable a job which heretofore required highly skilled workers to do by hand. This system applies to almost any type of molded socket which will stand the heat of a solder pot for a few seconds. The contacts should come out the bottom and the only other openings must be in the top.

Figure 6:
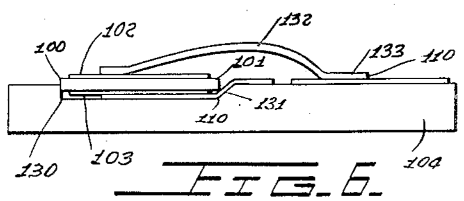
Figure 6 is a side view of a mounted disc capacitor.

The disc condenser may be mounted in a horizontal position as shown in Figure 6. Disc 100 fits into an indentation 130 in board 104. Indentation 130 has a conductor 131 leading to part of printed circuit 110. A clip 132, similar to the clips discussed above, holds the disc condenser 100 down and makes contact with part of the printed circuit 110.

Figure 5:
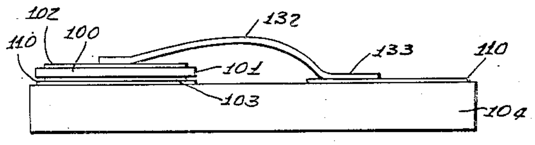
Figure 5 is a side view of a mounted disc capacitor.

The disc condenser may be mounted parallel to the dielectric board with an indentation as shown in Figure 5 where clip 132 positions disc condenser 100 in a similar manner as described above.

A modification of the present invention is to have a multiple of conducting areas on one side of the circular disc and one solid conducting surface on the other.

Figure 7:
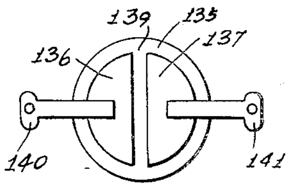
Figure 7 is a top view of a modified disc capacitor of the present invention.

In Figure 7 dielectric disc 135 has two semicircular areas 136 and 137 on one side and surface 138 on the other side. The semicircular areas 136 and 137 are separated by the area 139 of the dielectric. This disc condenser is essentially two condensers in one with one common plate 138. The semicircular areas 136 and 137 are connected to other parts of the printed circuit by means of clips 140 and 141 in a similar manner as described in reference to the previous figures.

Figure 8:
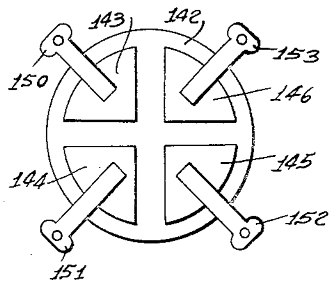
Figure 8 is a top view of a modified disc capacitor of the present invention.

A further modification is shown in Figure 8 where a circular disc 112 has conducting areas 143, 144, 145 and 146 on one side, and a solid silver side 147 on the other side. Four spring clips 150, 151, 152 and 153 may lead into four separate circuits from the top conducting areas of this condenser. The assembly process is merely a matter of eyeletting these preformed clips to terminal strips on the printed board and dip soldering the unit. This procedure allows one condenser to take the place where two duals or four singles or semi-combination thereof have been used in the past.

The condenser accords a great conservation of space since four units are contained on one 1/2 inch disc. These four condensers can be used in any circuit with the only restriction that one of them should not be too much larger than the rest, as for example, an input filament by-pass, the B+ input by-pass, the B+ by-pass on the plate of a radio frequency tube and a by-pass on the B+ input circuit to a mixer plate in a television tuner.

A distinct advantage is that all lead inductances can be brought to an extreme minimum by the proper selection of proper clips and grounding mechanisms.

Ceramic or mica buttons can be simulated by using a very large diameter eyelet for the grounding side so that contact is made fairly close, for example, to the outer edge of the ground silvered side and a broad clip terminal for the other side.

Previous attempts to duplicate the mica button by putting a hole from the center of the ceramic disc was unsatisfactory due to the fragility of the ceramic. Staking an eyelet through the center sets up strains that cause fracture upon application of heat of soldering.

In the foregoing we have described our invention solely in connection with specific illustrative embodiments thereof. Since many variations and modifications of the invention will now be obvious to those skilled in the art, we prefer to be bound not by the specific disclosures herein contained but only by the appended claims.

We claim:

1. A printed circuit comprising a base of insulating material; conductive, essentially two-dimensional with regards to said base, circuit components; said two-dimensional circuit components being rigidly attached to said base; a resilient conductor clip member secured at one end thereof on said base in conductive relation with said circuit components, and a slot in said base of insulating material, said slot comprising a length and a width, a disc condenser having a diameter greater than said width of said slot, said disc condenser being positioned in said slot and frictionally held therein by said clip member, maintaining said condenser in position such that electrical contact from the bottom of said condenser to said two-dimensional circuit components is made and establishes electrical contact from said clip to said condenser, said disc condenser being additionally secured in position to said clip member by a solder.

2. A printed circuit comprising a base of insulating material; conductive circuit components rigidly attached to said base, said circuit component being essentially two dimensional with relation to said base and in surface to surface engagement therein; an opening in said base; a three dimensional circuit component insertable in said opening; the material of the base defining said opening receiving and supporting said last mentioned circuit component; the maximum dimension of said opening being less than a dimension of said last mentioned circuit component, said last mentioned circuit component varying in size at one portion thereof from a dimension insertable through said opening to a dimension equal to that of said opening and to a dimension greater than said opening; the position of said last mentioned circuit component in said opening being determined by the location thereon of the portion thereof equal in dimension to that of the opening; said opening and said last mentioned circuit component having substantially equal cross section in a plane normal to that of the maximum dimension of the opening, a resilient conductor clip member secured at one end thereof on said base in conductive relation with said circuit components, said clip member extending substantially parallel to said base and the other thereof extending over said opening, said clip resiliently deformed by said three dimensional circuit component, maintaining said condenser in position such that electrical contact from the bottom of said three dimensional component to said two dimensional circuit component is made, and establishing electrical contact from said clip to said three dimensional circuit component.

3. A printed circuit comprising a base of insulating material; conductive circuit components regidly attached to said base, said circuit component being essentially two dimensional with relation to said base and in surface to surface engagement therein; an opening in said base; a three dimensional circuit component insertable in said opening; the material of the base defining said opening receiving and supporting said last mentioned circuit component; the maximum dimension of said opening being less than a dimension of said last mentioned circuit component; resilient conductor clip members secured at one end thereof on said base in conductive relation with said circuit components, said clip members extending substantially parallel to said base, said three dimensional circuit components having a thickness greater than the original distance between the base and the clips, each of said clips being resiliently deformed by one of said three dimensional circuit components, maintaining said three dimensional circuit components in position and establishing electrical contact from each of said clips to one of said three dimensional circuit components.

References Cited in the file of this patent

UNITED STATES PATENTS

| | | |
|---|---|---|
| 1,837,962 | Hensgen | Dec. 22, 1931 |
| 2,344,197 | Barnard | Mar. 14, 1944 |
| 2,458,365 | Fyler | Jan. 4, 1949 |
| 2,542,793 | Brenta | Feb. 20, 1951 |
| 2,607,821 | Van Arsdell | Aug. 19, 1952 |
| 2,626,448 | Shive | Jan. 27, 1953 |

OTHER REFERENCES

Product Engineering, April, 1948, pages 141 and 142.